US012686574B2

(12) United States Patent
Cao

(10) Patent No.: US 12,686,574 B2
(45) Date of Patent: Jul. 21, 2026

(54) METHOD FOR CONTROLLING AUTOMATIC LOADING OR UNLOADING MACHINE, CONTROL DEVICE, AND READABLE STORAGE MEDIUM

(71) Applicant: SHENZHEN KUBO SOFTWARE CO., LTD, Shenzhen (CN)

(72) Inventor: Chunxia Cao, Shenzhen (CN)

(73) Assignee: SHENZHEN KUBO SOFTWARE CO., LTD, Shenzhen (CN)

( * ) Notice: Subject to any disclaimer, the term of this patent is extended or adjusted under 35 U.S.C. 154(b) by 350 days.

(21) Appl. No.: 18/538,405

(22) Filed: Dec. 13, 2023

(65) Prior Publication Data

US 2024/0109736 A1 Apr. 4, 2024

Related U.S. Application Data

(63) Continuation of application No. PCT/CN2022/100400, filed on Jun. 22, 2022.

(30) Foreign Application Priority Data

Jun. 24, 2021 (CN) .......................... 202110706663.5

(51) Int. Cl.
*B65G 65/00* (2006.01)
*B65G 1/04* (2006.01)
*B65G 1/137* (2006.01)

(52) U.S. Cl.
CPC ......... *B65G 65/005* (2013.01); *B65G 1/0414* (2013.01); *B65G 1/0492* (2013.01);
(Continued)

(58) Field of Classification Search
CPC .......................... B65G 1/0414; B65G 1/0492
See application file for complete search history.

(56) References Cited

U.S. PATENT DOCUMENTS

2014/0229001 A1 8/2014 Tsujita
2020/0254490 A1 8/2020 Lundahl et al.
(Continued)

FOREIGN PATENT DOCUMENTS

CN 1685662 A 10/2005
CN 110304384 A 10/2019
(Continued)

OTHER PUBLICATIONS

CN209834675U_Machine Translation, Li Zipeng, Stacking Machine With Fault Lighting Device, 2019.*
(Continued)

*Primary Examiner* — Gene O Crawford
(74) *Attorney, Agent, or Firm* — Ladas & Parry, LLP

(57) ABSTRACT

Embodiments of the present disclosure provide a method for controlling an automatic loading or unloading machine and apparatus, a control device, and a readable storage medium. The method includes: controlling a sub-device of an automatic loading or unloading machine corresponding to a fault point to go offline when the fault point is detected during execution of a current task by the automatic loading or unloading machine and the transport robot; and controlling the offline sub-device to go online and initializing the transport robot and the offline sub-device after the fault point is eliminated, to cause the transport robot and the offline sub-device to re-execute the current task. The method provided by the present disclosure can realize orderly bringing-online and bringing-offline of the automatic loading or unloading machine.

17 Claims, 7 Drawing Sheets

(52) U.S. Cl.
CPC .... *B65G 1/1373* (2013.01); *B65G 2203/0225* (2013.01); *B65G 2203/0258* (2013.01); *B65G 2203/0283* (2013.01); *B65G 2203/041* (2013.01); *B65G 2203/042* (2013.01); *G05B 2219/40006* (2013.01); *G05B 2219/50393* (2013.01)

(56) References Cited

U.S. PATENT DOCUMENTS

| | | |
|---|---|---|
| 2020/0348654 A1 | 11/2020 | Anand |
| 2020/0369472 A1 | 11/2020 | Pietrowicz |
| 2020/0391963 A1 | 12/2020 | Carpenter et al. |

FOREIGN PATENT DOCUMENTS

| | | |
|---|---|---|
| CN | 110450129 A | 11/2019 |
| CN | 209834675 U | 12/2019 |
| CN | 110884818 A | 3/2020 |
| CN | 110980081 A | 4/2020 |
| CN | 111461488 A | 7/2020 |
| CN | 111620024 A | 9/2020 |
| CN | 112246676 A | 1/2021 |
| CN | 112262087 A | 1/2021 |
| CN | 112265773 A | 1/2021 |
| CN | 112407727 A | 2/2021 |
| CN | 112478342 A | 3/2021 |
| CN | 112722675 A | 4/2021 |
| CN | 112850127 A | 5/2021 |
| CN | 113371378 A | 9/2021 |
| FR | 3096364 A1 | 11/2020 |
| KR | 101770161 B1 | 9/2017 |
| WO | 2019028482 A1 | 2/2019 |

OTHER PUBLICATIONS

The Extended European Search Report dated Sep. 16, 2024 issued by EPO in EP patent Appln. No. 22827604.4.

The First Chinese Office Action dated Dec. 12, 2025 from Chinese Patent Appln. 202310319392.7, with search report.

* cited by examiner

112

1121    1122

1123

1123

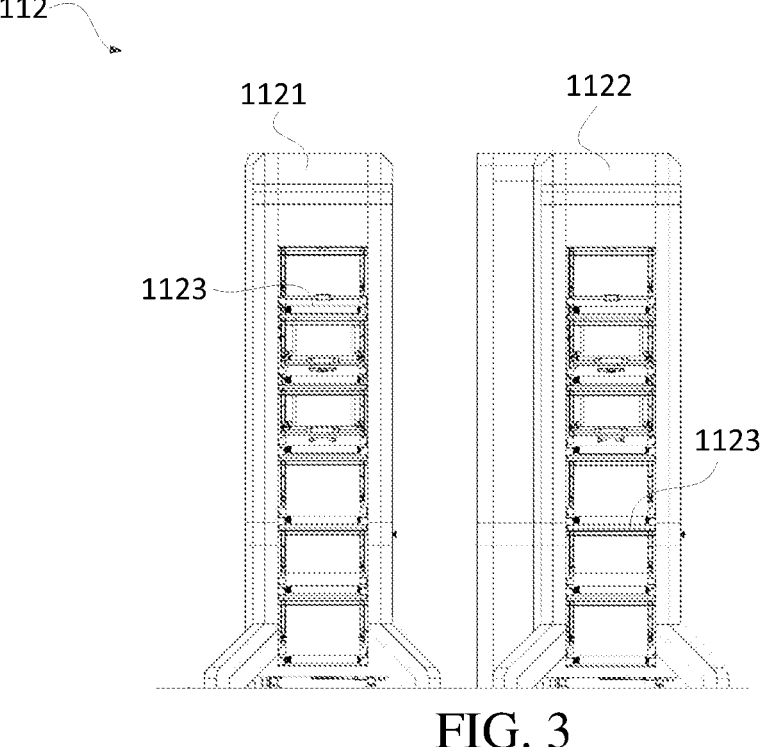

FIG. 3

101 a sub-device of the automatic loading or unloading machine corresponding to a fault point is controlled to go offline when the fault point is detected during execution of a current task by the automatic loading or unloading machine and the transport robot

102 the offline sub-device is controlled to go online and initialize the transport robot and the offline sub-device after the fault point is eliminated, to cause the transport robot and the offline sub-device to re-execute the current task

FIG. 4

201 a sub-device of the automatic loading or unloading machine corresponding to a fault point is controlled to go offline when the fault point is detected during execution of a current task by the automatic loading or unloading machine and the transport robot

202 after the fault point is eliminated, the offline sub-device is controlled to go online, the transport robot is controlled to switch back to an operating state of the transport robot before interacting with the automatic loading or unloading machine, and the offline sub-device is controlled to switch back to an operating state of the automatic loading or unloading machine before the interacting with the transport robot, so as to cause the transport robot and the offline sub-device to re-execute the current task

FIG. 5

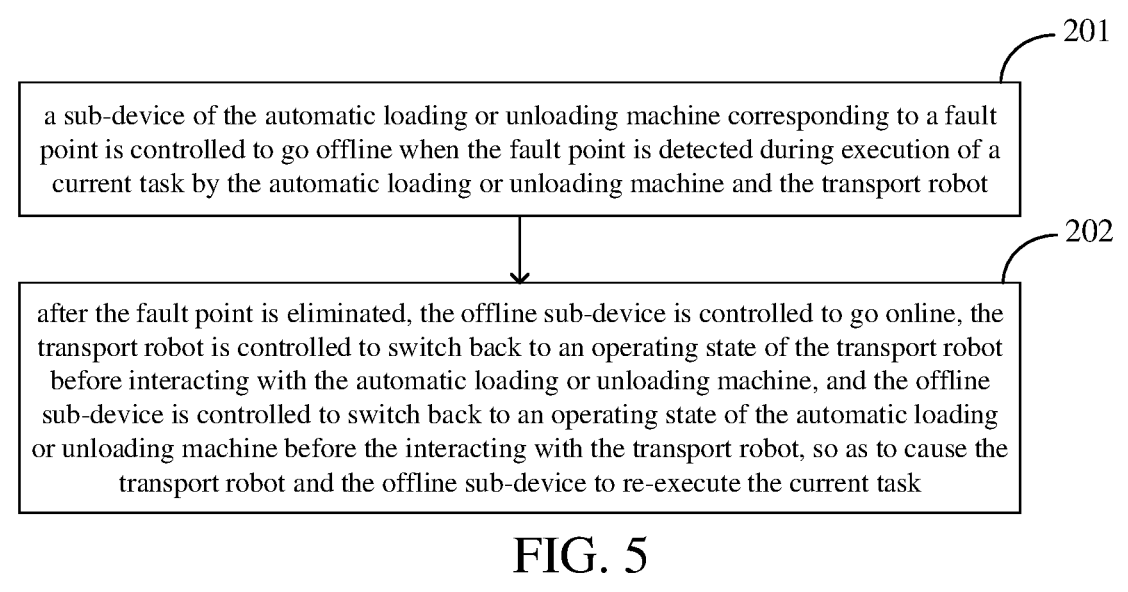

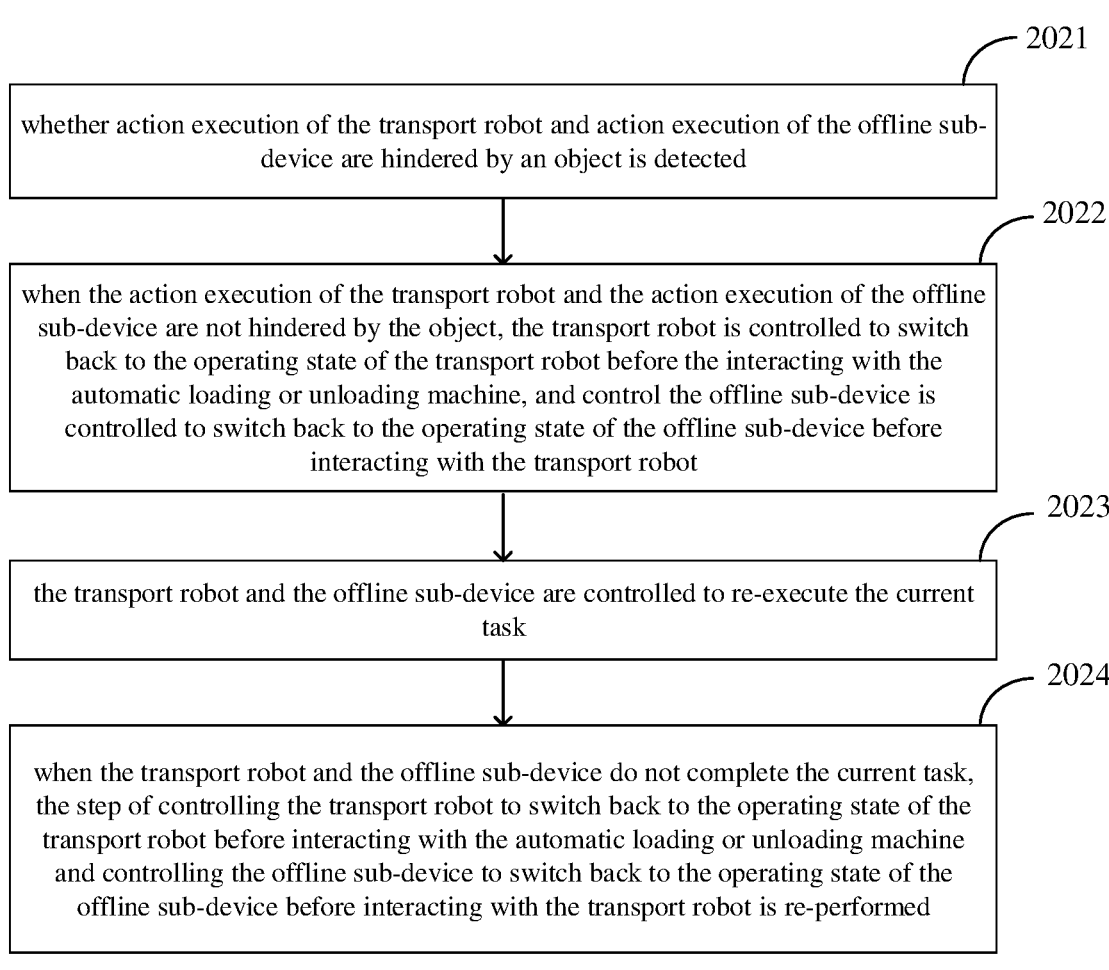

whether action execution of the transport robot and action execution of the offline sub-device are hindered by an object is detected ⸺ 2021 when the action execution of the transport robot and the action execution of the offline sub-device are not hindered by the object, the transport robot is controlled to switch back to the operating state of the transport robot before the interacting with the automatic loading or unloading machine, and control the offline sub-device is controlled to switch back to the operating state of the offline sub-device before interacting with the transport robot ⸺ 2022 the transport robot and the offline sub-device are controlled to re-execute the current task ⸺ 2023 when the transport robot and the offline sub-device do not complete the current task, the step of controlling the transport robot to switch back to the operating state of the transport robot before interacting with the automatic loading or unloading machine and controlling the offline sub-device to switch back to the operating state of the offline sub-device before interacting with the transport robot is re-performed ⸺ 2024

FIG. 6

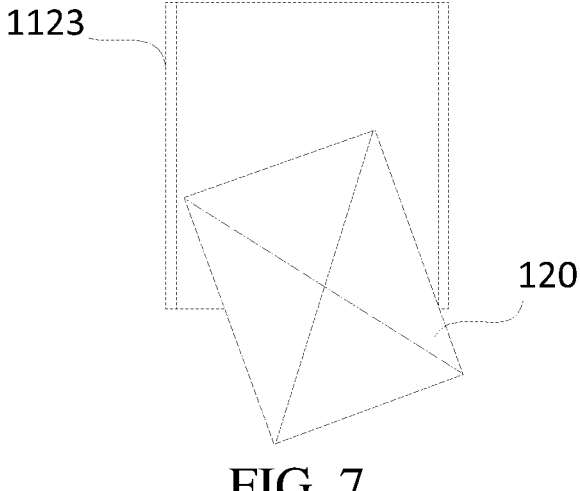

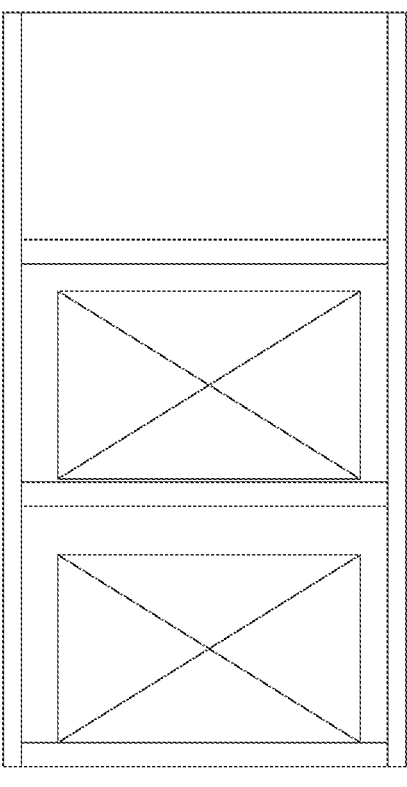

FIG. 8

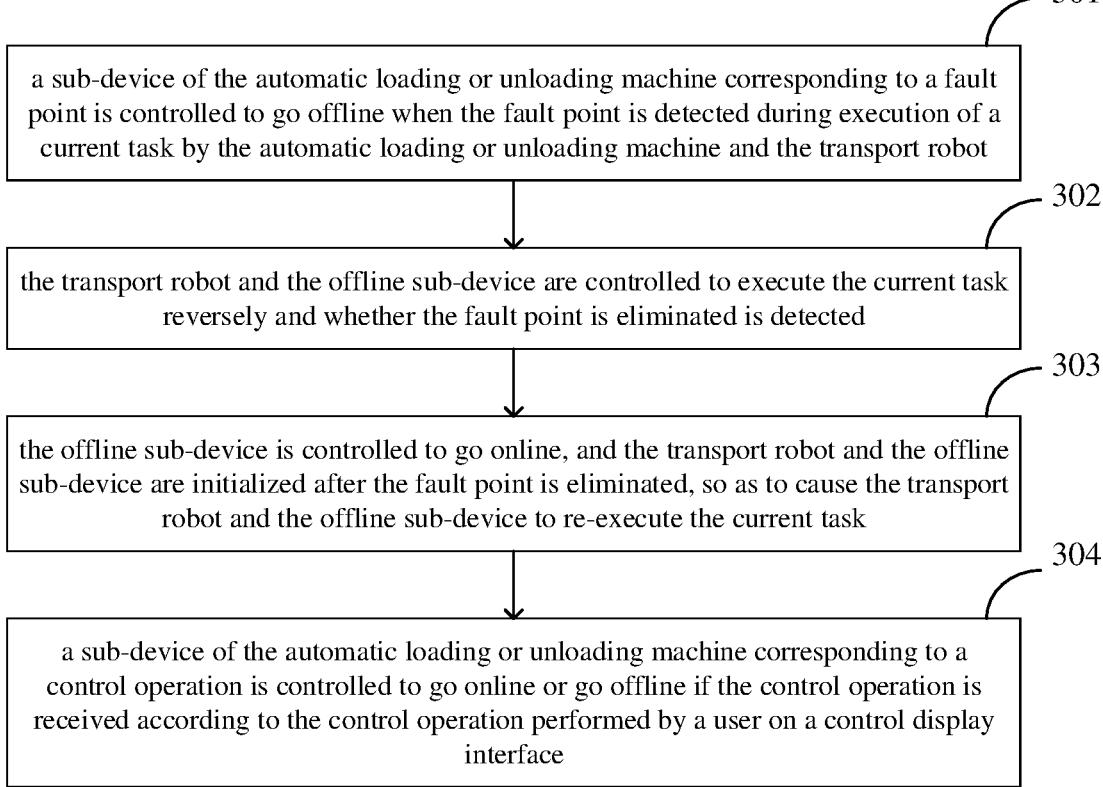

301 a sub-device of the automatic loading or unloading machine corresponding to a fault point is controlled to go offline when the fault point is detected during execution of a current task by the automatic loading or unloading machine and the transport robot

302 the transport robot and the offline sub-device are controlled to execute the current task reversely and whether the fault point is eliminated is detected

303 the offline sub-device is controlled to go online, and the transport robot and the offline sub-device are initialized after the fault point is eliminated, so as to cause the transport robot and the offline sub-device to re-execute the current task

304 a sub-device of the automatic loading or unloading machine corresponding to a control operation is controlled to go online or go offline if the control operation is received according to the control operation performed by a user on a control display interface

FIG. 9

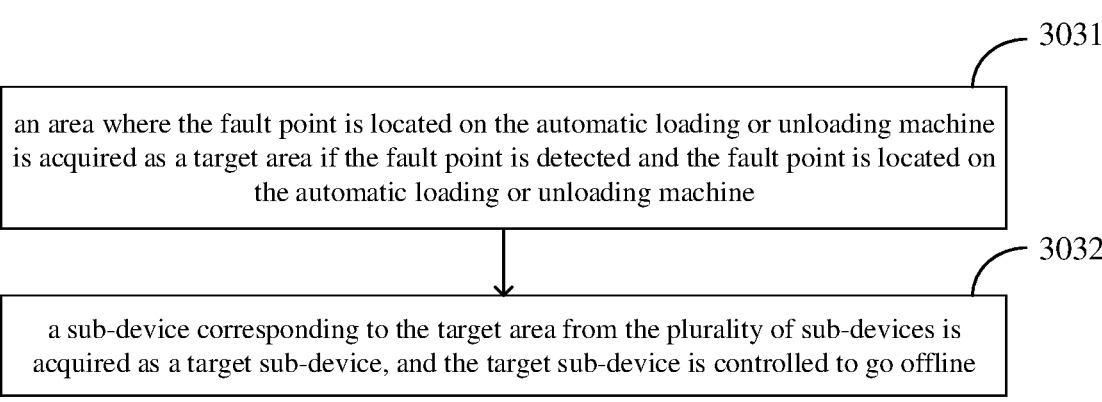

an area where the fault point is located on the automatic loading or unloading machine is acquired as a target area if the fault point is detected and the fault point is located on the automatic loading or unloading machine a sub-device corresponding to the target area from the plurality of sub-devices is acquired as a target sub-device, and the target sub-device is controlled to go offline

FIG. 10

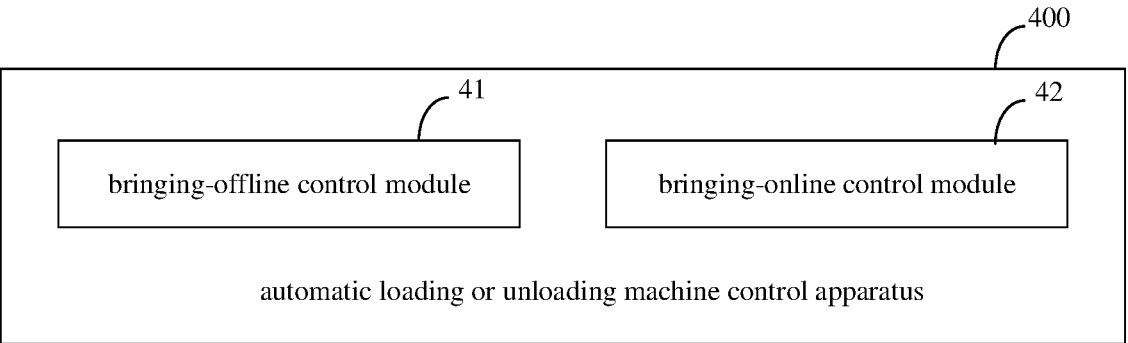

bringing-offline control module bringing-online control module automatic loading or unloading machine control apparatus

FIG. 11

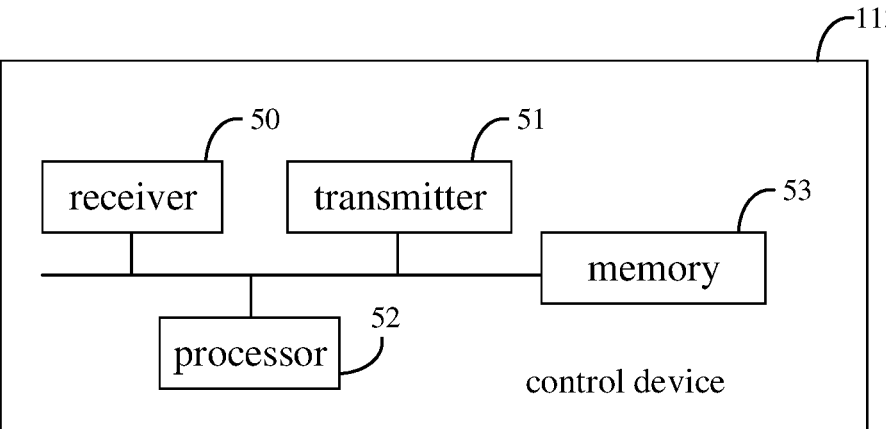

receiver transmitter memory processor control device

FIG. 12

METHOD FOR CONTROLLING AUTOMATIC LOADING OR UNLOADING MACHINE, CONTROL DEVICE, AND READABLE STORAGE MEDIUM

This application is a continuation of International Patent Application No. PCT/CN2022/100400 filed on Jun. 22, 2022, which claims priority to Chinese Patent Application No. 202110706663.5, filed with the China National Intellectual Property Administration on Jun. 24, 2021, entitled "METHOD FOR CONTROLLING AUTOMATIC LOADING OR UNLOADING MACHINE, APPARATUS, CONTROL DEVICE, AND READABLE STORAGE MEDIUM", which are incorporated by reference herein in their entireties.

TECHNICAL FIELD

The present disclosure relates to the field of intelligent warehousing technologies, and in particular, to a method for controlling an automatic loading or unloading machine, a control device, and a readable storage medium.

BACKGROUND

During interaction between an automatic loading or unloading machine and a transport robot, loading or unloading errors caused by deviation of a container and a fault caused by a device problem are likely to occur. When a fault occurs, a maintenance person is required to enter the site to solve the fault. The automatic loading or unloading machine is a large machine, which needs to go online and go offline in order.

Currently, the automatic loading or unloading machine is manually controlled by a person to go online and go offline. The person adjusts the automatic loading or unloading machine to be online or offline according to a loading or unloading status of the site.

However, when the fault occurs, the person usually cannot control the automatic loading or unloading machine to go offline in time, and therefore may not ensure orderly bringing-online and bringing-offline of the automatic loading or unloading machine.

SUMMARY

Embodiments of the present disclosure provide a method for controlling an automatic loading or unloading machine and apparatus, a control device, and a readable storage medium, which realizes orderly bringing-online and bringing-offline of an automatic loading or unloading machine.

According to a first aspect, an embodiment of the present disclosure provides a method for controlling an automatic loading or unloading machine. The method is applicable to a control device of a loading or unloading system. The loading or unloading system includes the control device, an automatic loading or unloading machine, and a transport robot, and the method includes:

controlling a sub-device of the automatic loading or unloading machine corresponding to a fault point to go offline when the fault point is detected during execution of a current task by the automatic loading or unloading machine and the transport robot; and controlling the offline sub-device to go online and initializing the transport robot and the offline sub-device after the fault point is eliminated, to cause the transport robot and the offline sub-device to re-execute the current task.

In a possible implementation, the controlling a sub-device of the automatic loading or unloading machine corresponding to a fault point to go offline when the fault point is detected includes:

controlling the sub-device of the automatic loading or unloading machine corresponding to the fault point to go offline when the fault point is detected, and acquiring a position of the transport robot; and controlling the transport robot to stop moving when the position of the transport robot is in a designated operating area.

In a possible implementation, the controlling a sub-device in the automatic loading or unloading machine corresponding to a fault point to go offline when the fault point is detected includes:

detecting whether the sub-device corresponding to the fault point has an unfinished task instruction when the fault point is detected; and controlling the sub-device corresponding to the fault point to complete the unfinished task instruction when the sub-device corresponding to the fault point has the unfinished task instruction, and controlling the sub-device corresponding to the fault point to go offline.

In a possible implementation, the initializing the transport robot and the offline sub-device includes:

controlling the transport robot to switch back to an operating state of the transport robot before interacting with the automatic loading or unloading machine, and controlling the offline sub-device to switch back to an operating state of the offline sub-device before interacting with the transport robot.

In a possible implementation, the controlling the transport robot to switch back to an operating state of the transport robot before interacting with the automatic loading or unloading machine, and controlling the offline sub-device to switch back to an operating state of the offline sub-device before interacting with the transport robot includes:

detecting whether action execution of the transport robot and action execution of the offline sub-device are hindered by an object; and when the action execution of the transport robot and the action execution of the offline sub-device are not hindered by the object, controlling the transport robot to switch back to the operating state of the transport robot before interacting with the automatic loading or unloading machine, and controlling the offline sub-device to switch back to the operating state of the offline sub-device before interacting with the transport robot.

In a possible implementation, after the controlling the transport robot to switch back to the operating state of the transport robot before interacting with the automatic loading or unloading machine, and controlling the offline sub-device to switch back to the operating state of the offline sub-device before interacting with the transport robot, the method further includes:

controlling the transport robot and the offline sub-device to re-execute the current task; and when the transport robot and the offline sub-device do not complete the current task, re-performing the step of controlling the transport robot to switch back to the operating state of the transport robot before interacting with the automatic loading or unloading machine, and controlling the offline sub-device to switch back to the operating state of the offline sub-device before interacting with the transport robot.

In a possible implementation, the initializing the transport robot and the offline sub-device further includes:

controlling, when a container is detected in an area corresponding to the fault point, the transport robot and the automatic loading or unloading machine to transport the container back to a position where the container is located before the interaction between the automatic loading or unloading machine and the transport robot.

In a possible implementation, the initializing the transport robot and the offline sub-device further includes:

controlling, when at least two containers are detected on the automatic loading or unloading machine, the transport robot and the automatic loading or unloading machine to transport the at least two containers back to positions where the at least two containers are located before the interaction between the automatic loading or unloading machine and the transport robot.

In a possible implementation, before the controlling the offline sub-device to go online, and initializing the transport robot and the offline sub-device, the method further includes:

controlling the transport robot and the offline sub-device to execute the current task reversely and detecting whether the fault point is eliminated.

In a possible implementation, the current task includes a plurality of task process nodes, and the controlling the transport robot and the offline sub-device to execute the current task reversely and detecting whether the fault point is eliminated includes:

acquiring a task process node corresponding to the fault point from the plurality of task process nodes as a fault process node; and controlling the transport robot and the offline sub-device to switch to a previous task process node of the fault process node and detecting whether the fault point is eliminated.

In a possible implementation, the automatic loading or unloading machine includes a plurality of sub-devices, and the controlling a sub-device in the automatic loading or unloading machine corresponding to a fault point to go offline if the fault point is detected includes:

acquiring, when the fault point is detected and the fault point is located on the automatic loading or unloading machine, an area where the fault point is located on the automatic loading or unloading machine as a target area; and acquiring, as a target sub-device, a sub-device corresponding to the target area from the plurality of sub-devices, and controlling the target sub-device to go offline.

In a possible implementation, the plurality of sub-devices include a loader and an unloader.

In a possible implementation, the automatic loading or unloading machine includes a plurality of sub-devices, and the controlling a sub-device in the automatic loading or unloading machine corresponding to a fault point to go offline if the fault point is detected includes:

when the fault point is detected and the fault point is located on the transport robot, acquiring, as a target sub-device, a sub-device corresponding to a task performed by the transport robot where the fault point is located from the plurality of sub-devices; and controlling the target sub-device to go offline.

In a possible implementation, the method further includes:

controlling, according to a control operation performed by a user on a control display interface, a sub-device of the automatic loading or unloading machine corresponding to the control operation to go online or go offline when the control operation is received.

According to a second aspect, the present disclosure further provides an automatic loading or unloading machine control system. The system is applicable to a control device of a loading or unloading system. The loading or unloading system includes the control device, an automatic loading or unloading machine, and a transport robot, and the method includes:

a bringing-offline control module, configured to control a sub-device of the automatic loading or unloading machine corresponding to a fault point to go offline when the fault point is detected during execution of a current task by the automatic loading or unloading machine and the transport robot; and a bringing-online and initialization control module, configured to control the offline sub-device to go online and initialize the transport robot and the offline sub-device after the fault point is eliminated, to cause the transport robot and the offline sub-device to re-execute the current task.

According to a third aspect, the present disclosure further provides a control device. The control device includes a memory and a processor, where the memory is configured to store instructions executable by the processor; and the processor is configured to perform the method for controlling an automatic loading or unloading machine provided in any embodiment corresponding to the first aspect.

According to a fourth aspect, the present disclosure further provides a computer-readable storage medium. The computer-readable storage medium stores computer-executable instructions. The computer-executable instructions, when executed by a processor, are configured to implement the method for controlling an automatic loading or unloading machine provided in any embodiment corresponding to the first aspect of the present disclosure.

According to a fifth aspect, the present disclosure further provides a computer program product. The computer program product includes a computer program. The computer program, when executed by a processor, is configured to implement the method for controlling an automatic loading or unloading machine provided in any embodiment corresponding to the first aspect of the present disclosure.

According to the method for controlling an automatic loading or unloading machine and apparatus, the control device, and the readable storage medium provided in the embodiments of the present disclosure. The method includes: controlling a sub-device in an automatic loading or unloading machine corresponding to a fault point to go offline if the fault point is detected during execution of a current task by the automatic loading or unloading machine and the transport robot; and controlling the offline sub-device to go online and initializing the transport robot and the offline sub-device after the fault point is eliminated, to cause the transport robot and the offline sub-device to re-execute the current task. That is to say, even without a human intervention, the automatic loading or unloading machine can automatically go offline according to the detected fault and automatically go online and realizes initialization after the fault is eliminated, which avoids a loss caused by a failure of controlling the device to go online/ offline in time, and ensures that the automatic loading or unloading machine can go online or go offline in order.

BRIEF DESCRIPTION OF THE DRAWINGS

The accompanying drawings herein, which are incorporated into the specification and constitute a part of the specification, illustrate embodiments that conform to the present disclosure and are used together with the specification to explain the principles of the present disclosure.

FIG. 3 is a schematic structural diagram of an automatic loading or unloading machine according to an embodiment of the present disclosure.

FIG. 4 is a flowchart of a method for controlling an automatic loading or unloading machine according to an embodiment of the present disclosure.

FIG. 5 is a flowchart of a method for controlling an automatic loading or unloading machine according to another embodiment of the present disclosure.

FIG. 6 is a flowchart of step 202 in the embodiment shown in FIG. 5 of the present disclosure.

FIG. 7 is a schematic diagram of a position distribution of a container and a shelving unit according to an embodiment of the present disclosure.

FIG. 8 is a schematic diagram of a position distribution of a container and a shelving unit according to another embodiment of the present disclosure.

FIG. 9 is a flowchart of a method for controlling an automatic loading or unloading machine according to still another embodiment of the present disclosure.

FIG. 10 is a flowchart of step 303 in the embodiment shown in FIG. 9 of the present disclosure.

FIG. 11 is a schematic structural diagram of an automatic loading or unloading machine control apparatus according to an embodiment of the present disclosure.

FIG. 12 is a block diagram of a control device according to an embodiment of the present disclosure.

Figure 1:
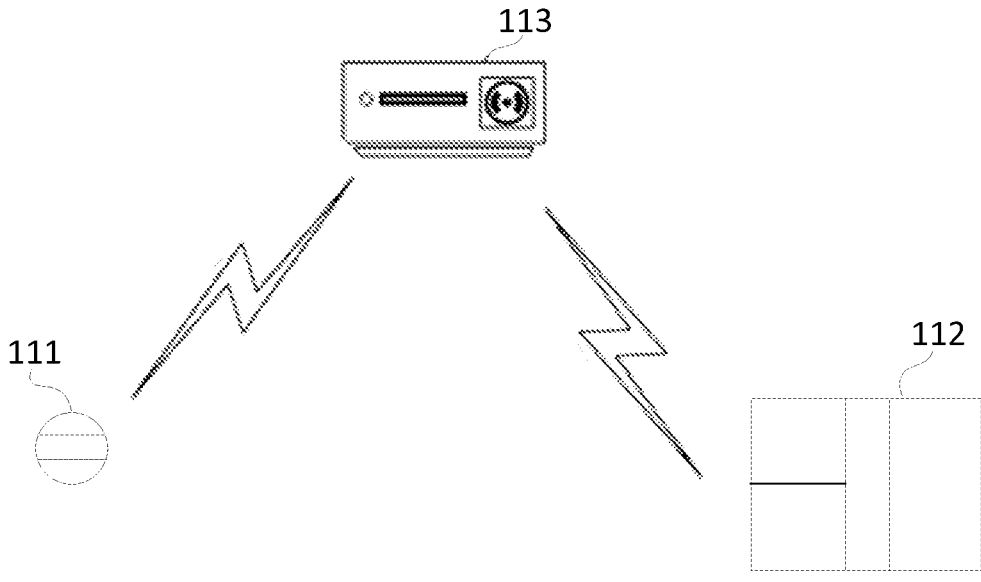
FIG. 1 is a diagram of an application scenario of a method for controlling an automatic loading or unloading machine according to an embodiment of the present disclosure.

Specific embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the disclosure. On the contrary, they are merely examples of apparatuses and methods consistent with some aspects of the disclosure as detailed in the appended claims.

In the field of automated factory and intelligent warehousing, loading or unloading of goods are usually finished through cooperation of a transport robot and an automatic loading or unloading machine. During interaction between the automatic loading or unloading machine and the transport robot, loading or unloading errors caused by deviation of a container and a fault caused by a device problem are likely to occur, and which causes a failure of goods loading or unloading. Therefore, the automatic loading or unloading machine needs to go offline, so that a person can remove the fault.

Currently, the automatic loading or unloading machine is manually controlled by a person to go online and go offline. The person adjusts the automatic loading or unloading machine to be online or offline according to a loading or unloading condition of the site.

However, the person usually cannot find the fault of the automatic loading or unloading machine in time, and therefore cannot bring the automatic loading or unloading machine offline in time. As a result, it is difficult to ensure orderly bringing-online and bringing-offline of the automatic loading or unloading machine.

In addition, currently, the person usually brings the whole automatic loading or unloading machine offline or online. However, the automatic loading or unloading machine includes a plurality of sub-devices such as a loader and an unloader. If all of the sub-devices are offline because of the failure of one of the sub-devices, the operating efficiency of the automatic loading or unloading machine is significantly reduced.

The embodiments of the present disclosure provide a method for controlling an automatic loading or unloading machine and apparatus, a control device, and a readable storage medium, to solve the above technical problems of the related art. According to the method for controlling an automatic loading or unloading machine and apparatus, the control device, and the readable storage medium provided in the embodiments of the present disclosure, the automatic loading or unloading machine can accurately go online and go offline in order, and impact on the operating efficiency of the automatic loading or unloading machine during control of the automatic loading or unloading machine to go online/offline is reduced.

The technical solutions of the present disclosure and how the technical solutions solve the above technical problems are described in detail in the specific embodiments below. The following several specific embodiments may be combined with each other, and a same or similar concept or process may not be repeated in some embodiments. The embodiments of the present disclosure are described below with reference to the accompanying drawings.

An application scenario of the embodiments of the present disclosure is described below.

FIG. 1 is a diagram of an application scenario of a method for controlling an automatic loading or unloading machine according to an embodiment of the present disclosure. As shown in FIG. 1, the application scenario may be a loading or unloading system. The loading or unloading system may include a transport robot 111, an automatic loading or unloading machine 112, and a control device 113. The control device 113 may establish a communicative link with the transport robot 111 and the automatic loading or unloading machine 112, so as to control the automatic loading or unloading machine 112 and the transport robot 111. Specifically, the control device 113 may include an industrial control computer, a server, and the like.

Optionally, the loading or unloading system may include one or more transport robots 111 and one or more automatic loading or unloading machines 112.

Figure 2:
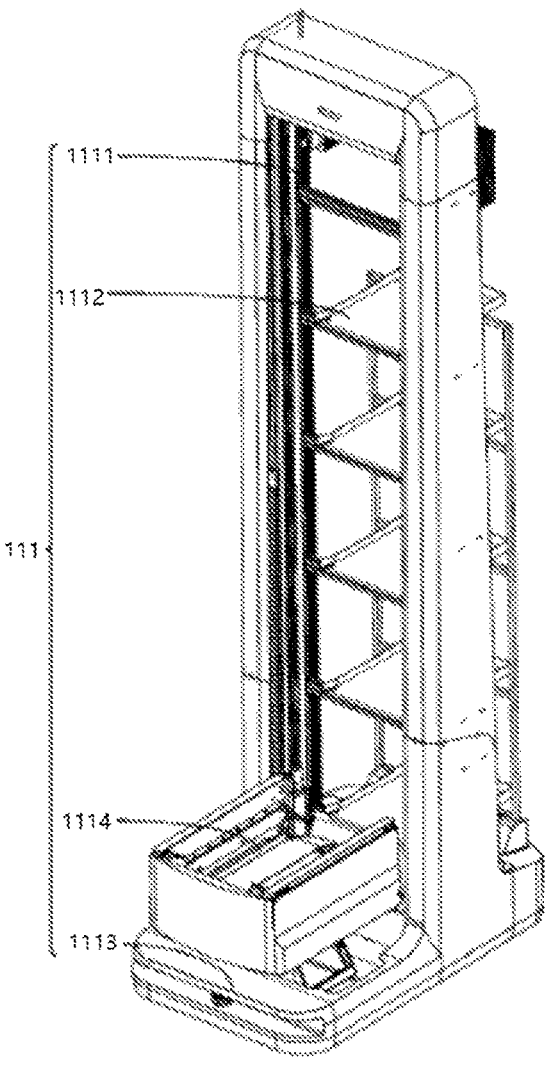
FIG. 2 is a schematic structural diagram of a transport robot according to an embodiment of the present disclosure.

As shown in FIG. 2, the transport robot 111 includes a mobile chassis 1113, a storage shelf 1112, a carrying apparatus 1114, and a lifting assembly 1111. The storage shelf 1112, the carrying apparatus 1114, and the lifting assembly 1111 are mounted to the mobile chassis 1113. A plurality of storage shelves 1112 may be arranged. The lifting assembly 1111 is configured to drive the carrying apparatus 1114 to move up and down, so that the carrying apparatus 1114 is aligned to any one of the plurality of storage shelves 1112, or is aligned to a rack and/or goods. The carrying apparatus 1114 may rotate around an axis along a vertical direction to adjust an orientation of the carrying apparatus 1114, so as to be aligned to the one of the plurality of storage shelves 1112, or aligned to the rack and/or the goods. The carrying apparatus 1114 is configured to load or unload goods, and carry the goods between the rack and the storage shelf 1112.

For example, the storage shelf 1112 may be optionally arranged or not arranged. When the storage shelf 1112 is not arranged, the goods are stored in an accommodating space of the carrying apparatus 1114 during the carrying of the goods by the transport robot 111.

As shown in FIG. 3, the automatic loading or unloading machine 112 may include a plurality of sub-devices. Specifically, the plurality of devices may be a power apparatus of the automatic loading or unloading machine, such as a loader 1121, an unloader 1122, a small elevator (not shown), and so on. A plurality of shelving units 1123 may be further arranged on the loader 1121 and the unloader 1122 of the automatic loading or unloading machine 112, and the plurality of shelving units 1123 may be arranged in layers. Optionally, the loader 1121 and the unloader 1122 may be arranged on a first side of the automatic loading or unloading machine 112, and the small elevator may be arranged on a second side of the automatic loading or unloading machine 112. Optionally, the first side is arranged opposite to the second side, and the automatic loading or unloading machine 112 may be engaged with the transport robot 111 on the first side, and engaged with other external devices, such as a conveyor line, on the second side.

FIG. 4 is a flowchart of a method for controlling an automatic loading or unloading machine according to an embodiment of the present disclosure. The automatic loading or unloading machine control is applicable to the control device in the above application environment. As shown in FIG. 4, the method for controlling an automatic loading or unloading machine provided in this embodiment may include the following operations:

In block 101: a sub-device of the automatic loading or unloading machine corresponding to a fault point is controlled to go offline when the fault point is detected during execution of a current task by the automatic loading or unloading machine and the transport robot.

The current task may be a task currently delivered by the control device to the automatic loading or unloading machine and the transport robot. For example, the current task may include a loading task, an unloading task, and the like.

The fault point may be an area point in the loading or unloading system where a fault occurs in each device area.

In some embodiments, a detection device for detecting the fault point may be arranged on the automatic loading or unloading machine or the transport robot. Optionally, the detection device includes but is not limited to a high-definition camera, a distance sensor, and a pressure sensor. Optionally, a plurality of detection devices may be arranged. The plurality of detection devices may be respectively arranged at different positions on the automatic loading or unloading machine and the transport robot. For example, the plurality of detection devices may be respectively arranged on the plurality of sub-devices of the automatic loading or unloading machine. For another example, the plurality of detection devices may be arranged in a plurality of storage shelves of the transport robot.

During the execution of the current task by the automatic loading or unloading machine and the transport robot, each of the detection devices may upload detected detection data to the control device, and the control device may determine whether the detection data is abnormal. If the detection data is abnormal, a detection area corresponding to the detection device from which the detection data is detected may be determined as the fault point.

As an example, the control device may determine whether the container is properly placed on a target sub-device of the automatic loading or unloading machine according to image information collected by the high-definition camera. If the container is not properly placed on the target sub-device, for example, the container is placed on a wrong position, or the image information does not include the target sub-device and so on, the target sub-device may be determined as the fault point, and the target sub-device in the automatic loading or unloading machine may be controlled to go offline. The target sub-device may include one or more target sub-devices. When there are a plurality of target sub-devices, the plurality of target sub-devices may be controlled to go offline.

In some embodiments, the control device may determine whether the container is properly placed on the target sub-device of the automatic loading or unloading machine according to pressure information collected by the pressure sensor. If the container is not properly placed on the target sub-device, for example, a detected weight of the container exceeds a weight threshold, or the weight of the container is not detected on the target sub-device, the target sub-device may be determined as the fault point, and the target sub-device in the automatic loading or unloading machine may be controlled to go offline.

In some embodiments, the control device may determine whether the container is properly placed on the target sub-device of the automatic loading or unloading machine according to distance information collected by the distance sensor. If the container is not properly placed on the target sub-device, for example, it is determined according to the distance information that a size of the container does not meet a condition or the container is skewed, the target sub-device may be determined as the fault point, and the target sub-device in the automatic loading or unloading machine may be controlled to go offline.

In some embodiments, the control device may determine whether the container is properly placed on the target sub-device of the automatic loading or unloading machine based on the high-definition camera, the distance sensor, and the pressure sensor. If the control device detects that some or all of detection results of the high-definition camera, the distance sensor, and the pressure sensor do not meet the condition, the control device determines the target sub-device as the fault point and controls the target sub-device to go offline.

It may be understood that when the sub-device of the automatic loading or unloading machine goes offline, the sub-device may be in an energized state, but the control device is disconnected from the sub-device. That is to say, the communicative link between the control device and the sub-device is cut off, and the sub-device cannot receive a task instruction from the control device. At this time, the person may independently control the automatic loading or unloading machine through a control interface built in the automatic loading or unloading machine.

In block 102: the offline sub-device is controlled to go online and initialize the transport robot and the offline sub-device after the fault point is eliminated, to cause the transport robot and the offline sub-device to re-execute the current task.

In some embodiments, after the fault point is eliminated by the person or through an external device, the control device may control the offline sub-device to go online, and then initialize the transport robot and the sub-device that goes online again. Specifically, the operation of initializing the transport robot and the sub-device that goes online again may be controlling the transport robot and sub-device to respectively return to an operating state of the transport robot and an operating state of the sub-device before the execution of the current task, and respectively return to a position where the transport robot is located or a position where the sub-device is located before the execution of the current task, or the like. Optionally, the initialization operation may further include controlling the transport robot and the offline sub-device to carry a container that is being loaded/unloaded to the position where the container is located before the execution of the current task or a position where the container is located before a loading or unloading action.

It may be understood that when the sub-device in the automatic loading or unloading machine goes online, the sub-device may be in an energized state, and the control device is connected to the sub-device. That is to say, the communicative link between the control device and the sub-device is not cut off, and the sub-device can receive a task instruction from the control device and execute the task instruction.

In this embodiment, the sub-device in the automatic loading or unloading machine corresponding to the fault point is controlled to go offline when the fault point is detected during the execution of the current task by the automatic loading or unloading machine and the transport robot, and the offline sub-device is controlled to go online and the transport robot and the offline sub-device are initialized after the fault point is eliminated, to cause the transport robot and the offline sub-device to re-execute the current task in order. That is to say, the automatic loading or unloading machine can automatically go offline in case of a fault without human intervention. Specifically, a corresponding sub-device may go offline in a targeted way according to a position of the fault point, so as to ensure normal operation of a non-faulty sub-device, thereby improving the operating efficiency of the automatic loading or unloading machine. Then the automatic loading or unloading machine automatically goes online and realizes initialization after the fault is eliminated, which avoids a loss caused by a failure of controlling the device to go online or offline in time, and ensures that the automatic loading or unloading machine can go online or go offline in order while realizing relatively high operating efficiency.

FIG. 5 is a flowchart of a method for controlling an automatic loading or unloading machine according to another embodiment of the present disclosure. The automatic loading or unloading machine control is applicable to the control device in the above application environment. As shown in FIG. 5, the method for controlling an automatic loading or unloading machine provided in this embodiment may include the following operations:

In block 201: a sub-device of the automatic loading or unloading machine corresponding to a fault point is controlled to go offline when the fault point is detected during execution of a current task by the automatic loading or unloading machine and the transport robot.

In some embodiments, a specific implementation of operation in block 201 may include: controlling the sub-device of the automatic loading or unloading machine corresponding to the fault point to go offline when the fault point is detected, and acquiring a position of the transport robot; and controlling the transport robot to stop moving when the position of the transport robot is in a designated operating area.

As an example, a positioning apparatus is arranged on the transport robot. The control device may receive position information uploaded by the positioning apparatus, and then determine whether the transport robot enters the designated area according to the position information. The transport robot is controlled to stay in place when entering the designated area. The designated operating area may be an operating area where the transport robot loads or unloads goods through the automatic loading or unloading machine.

As another example, a robot detection apparatus, such as an infrared sensor or an electronic tag scanning apparatus or the like, may be arranged in the designated operating area in advance. The robot detection apparatus is configured to detect whether the transport robot enters the designated operating area. When the sub-device goes offline, if the transport robot is detected in an area where the automatic loading or unloading machine is located, an operating area for loading or unloading is further detected, and if it is detected that the transport robot has entered the operating area for loading or unloading, the control device controls the transport robot to stay in place.

In this implementation, the transport robot entering the designated operating area is controlled to stop moving when the sub-device of the automatic loading or unloading machine goes offline, so as to stop the operation of the faulty device, thereby helping the person to eliminate the fault point in time.

In some other implementations, a specific implementation of step 201 may include: detecting whether the sub-device corresponding to the fault point has an unfinished task instruction when the fault point is detected; and controlling the sub-device corresponding to the fault point to complete the unfinished task instruction when the sub-device corresponding to the fault point has the unfinished task instruction, and controlling the sub-device corresponding to the fault point to go offline.

As an example, if the automatic loading or unloading machine has received the task instruction delivered by the control device, the automatic loading or unloading machine executes the received task instruction and then causes the sub-device corresponding to the fault point to go offline, so as to facilitate subsequent initialization after the device goes online.

In block 202: after the fault point is eliminated, the offline sub-device is controlled to go online, the transport robot is controlled to switch back to an operating state of the transport robot before interacting with the automatic loading or unloading machine, and the offline sub-device is controlled to switch back to an operating state of the automatic loading or unloading machine before the interacting with the transport robot, so as to cause the transport robot and the offline sub-device to re-execute the current task.

Optionally, the operating state of the transport robot before interacting with the automatic loading or unloading machine may be an operating state of the transport robot upon receipt of the current task, or may be an operating state before the transport robot performs a loading or unloading action in cooperation with the automatic loading or unloading machine. Correspondingly, the operating state of the automatic loading or unloading machine before interacting with the transport robot may be an operating state upon receipt of the current task, or an operating state of the automatic loading or unloading machine before a loading or unloading action in cooperation with the transport robot.

In some implementations, as shown in FIG. 6, a specific implementation of step 202 may include the following operations:

In block 2021: whether action execution of the transport robot and action execution of the offline sub-device are hindered by an object is detected.

As an example, a hinder detection apparatus for detecting whether the action execution is hindered by the object may be arranged on the transport robot and each sub-device of the automatic loading or unloading machine, and it is detected through the hinder detection apparatus whether the action execution of the transport robot and the action execution of the offline sub-device is hindered by the object.

For example, the hinder detection apparatus may include a pressure sensor arranged on the carrying apparatus of the transport robot. When the carrying apparatus pushes the container, if a pressure value detected by the pressure sensor exceeds a pressure threshold, it indicates that the pushing action of the transport robot is hindered.

For another example, the hinder detection apparatus may include a high-definition camera. The high-definition camera may be arranged on the shelving unit of the offline sub-device of the automatic loading or unloading machine to collect image information of the container and the shelving unit. The control device may determine a relative position relationship between the container and the shelving unit according to the image information. As shown in FIG. 7, if it is determined according to the image information that the container 120 and the shelving unit 1123 are misaligned, where the container 120 cannot be properly placed on the shelving unit when the container 120 and the shelving unit 1123 are misaligned, it may be determined that the action execution of the offline sub-device is hindered by the object.

As another example, if it is detected according to position information of each transport robot that the transport robot performing another task hinders the movement of the transport robot performing the current task, it may be determined that the action execution of the transport robot is hindered by the object.

In block 2022: when the action execution of the transport robot and the action execution of the offline sub-device are not hindered by the object, the transport robot is controlled to switch back to the operating state of the transport robot before the interacting with the automatic loading or unloading machine, and control the offline sub-device is controlled to switch back to the operating state of the offline sub-device before interacting with the transport robot.

Optionally, the loading or unloading system may further include a prompt apparatus electrically connected to the control device. The prompt apparatus may be an audio playback device, a display device, or the like. If it is detected that the action execution of the transport robot and the action execution of the offline sub-device are hindered by the object, the control device may control the prompt apparatus to send prompt information, to prompt the person that it is detected that the action execution of the transport robot and the action execution of the automatic loading or unloading machine are hindered.

In this implementation, it is detected whether the action execution of the transport robot and the action execution of the offline sub-device are hindered by the object, and if the action execution of the transport robot and the action execution of the offline sub-device are not hindered by the object, the transport robot is controlled to switch back to the operating state of the transport robot before interacting with the automatic loading or unloading machine, and the offline sub-device is controlled to switch back to the operating state of the offline sub-device before interacting with the transport robot, so as to ensure orderly initialization of the transport robot and the offline sub-device.

As an implementation, still referring to FIG. 6, step 202 may further include the following operations:

In block 2023: the transport robot and the offline sub-device are controlled to re-execute the current task.

After the transport robot is initialized and the offline sub-device goes online again and is initialized, the control device may re-transmit the task instruction of the current task to the transport robot and the sub-device, to instruct the transport robot and the sub-device to re-perform the action corresponding to the current task.

In block 2024: when the transport robot and the offline sub-device do not complete the current task, the step of controlling the transport robot to switch back to the operating state of the transport robot before interacting with the automatic loading or unloading machine and controlling the offline sub-device to switch back to the operating state of the offline sub-device before interacting with the transport robot is re-performed.

In some embodiments, for example, the current task is to unload the container on the transport robot. During the unloading, if it is detected that the unloading action of the transport robot and the unloading action of the offline sub-device are hindered and the current task cannot be completed, the control device may control the transport robot to switch back to the operating state of the transport robot before interacting with the automatic loading or unloading machine, and control the offline sub-device to switch back to the operating state of the offline sub-device before interacting with the transport robot.

In some implementations, a specific implementation of step 202 may include:

controlling, if a container is detected in an area corresponding to the fault point, the transport robot and the automatic loading or unloading machine to transport the container to a position where the container is located before the interaction between the automatic loading or unloading machine and the transport robot.

As an example, the offline sub-device is the loader of the automatic loading or unloading machine. As shown in FIG. 8, the loader of the automatic loading or unloading machine includes three layers of shelving units: an upper layer of shelving unit, a middle layer of shelving unit, and a lower layer of shelving unit. If it is detected that the fault point is specifically located in the middle layer of shelving unit of the loader, and the middle layer of shelving unit and the lower layer of shelving unit of the loader have containers placed thereon, the control device may control the transport robot and the automatic loading or unloading machine to carry the container in the middle layer of shelving unit to a position where the container is located before the interaction between the automatic loading or unloading machine and the transport robot. In this way, the accurate initialization of the container can be realized.

In some other implementations, a specific implementation of step 202 may include: controlling, if at least two containers are detected on the automatic loading or unloading machine, the transport robot and the automatic loading or unloading machine to transport the at least two containers to positions where the at least two containers are located before the interaction between the automatic loading or unloading machine and the transport robot.

As an example, still referring to FIG. 8, the loader of the automatic loading or unloading machine includes three layers of shelving units: an upper layer of shelving unit, a middle layer of shelving unit, and a lower layer of shelving unit, and the middle layer of shelving unit and the lower layer of shelving unit of the loader each have a container placed thereon. In this case, the container of the middle layer of shelving unit and the container of the lower layer of shelving unit may be respectively transported to the position where the two containers are located before the interaction between the automatic loading or unloading machine and the transport robot. If the container of the middle layer of shelving unit is originally in a first storage shelf of the transport robot and the container of the lower layer of shelving unit is originally in the first storage shelf of the transport robot, the container of the middle layer of shelving unit and the container of the lower layer of shelving unit may be transported back to the original positions on the transport robot during initialization of the containers. In this way, the transport robot and the offline sub-device can completely re-execute the current task.

FIG. 9 is a flowchart of a method for controlling an automatic loading or unloading machine according to an embodiment of the present disclosure. The method for controlling an automatic loading or unloading machine is applicable to the control device in the above application environment. As shown in FIG. 9, the method for controlling an automatic loading or unloading machine provided in this embodiment may include the following operations:

In block 301: a sub-device of the automatic loading or unloading machine corresponding to a fault point is controlled to go offline when the fault point is detected during execution of a current task by the automatic loading or unloading machine and the transport robot.

The specific implementation of operation 301 can be referred to operation 101, and the details are not repeated herein.

In block 302: the transport robot and the offline sub-device are controlled to execute the current task reversely and whether the fault point is eliminated is detected.

In some embodiments, for example, the offline sub-device is an unloader of the automatic loading or unloading machine, and the current task is that the transport robot pushes the container to the unloader. During reverse execution of the current task, the unloader may return the container to the transport robot. Then fault detection is performed by the detection device in the above embodiment, so as to determine whether the fault point is eliminated.

In some implementations, the current task includes a plurality of task process nodes, and a specific implementation of operation 301 may include: acquiring a task process node corresponding to the fault point from the plurality of task process nodes as a fault process node; and controlling the transport robot and the offline sub-device to switch to a previous task process node of the fault process node and detecting whether the fault point is eliminated.

The fault process node may be used as the fault point in this embodiment.

As an example, the plurality of task process nodes may include a container takeout node, a container transport node, and a container loading node. If the fault process node is the container loading node, the transport robot and the offline sub-device may be controlled to switch back to the container transport node, and it may be detected through the detection device whether the fault point is eliminated at the task process node of transporting the container.

It may be understood that when the transport robot and the offline sub-device are controlled to switch from the container loading node back to the container transport node, positions and actions of the transport robot and the offline sub-device, as well as a position and an attitude of the container are all switched to a state of the container transport node.

As an example, if the fault point is not eliminated after the transport robot and the offline sub-device are controlled to switch back to the previous task process node, the control device may control the transport robot and the offline sub-device to continue to switch to another previous task node, and detect whether the fault point is eliminated, thereby removing the fault point one by one according to the task process node and realizing accurate removal of the fault point.

In block 303: the offline sub-device is controlled to go online, and the transport robot and the offline sub-device are initialized after the fault point is eliminated, so as to cause the transport robot and the offline sub-device to re-execute the current task.

In some implementations, the automatic loading or unloading machine includes a plurality of sub-devices. As shown in FIG. 10, a specific implementation of step 301 may include the following operations:

In block 3011: an area where the fault point is located on the automatic loading or unloading machine is acquired as a target area if the fault point is detected and the fault point is located on the automatic loading or unloading machine.

As an example, the fault is a misalignment of a container in one of the shelving units of the loader of the automatic loading or unloading machine. In this case, the shelving unit where the container is placed may be determined as the target area.

In block 3012: a sub-device corresponding to the target area from the plurality of sub-devices is acquired as a target sub-device, and the target sub-device is controlled to go offline.

Based on the above example, since the target area is located on the loader of the automatic loading or unloading machine, the loader of the automatic loading or unloading machine may be determined as the target sub-device, and the loader may be controlled to go offline. In this way, the sub-device can accurately go offline according to the position of the fault point of the automatic loading or unloading machine.

Optionally, the plurality of sub-devices may include power apparatuses such as a loader, an unloader, a small elevator, and a carrying apparatus. The carrying apparatus may load the container from the shelving unit of the automatic loading or unloading machine to the transport robot, or unload the container from the transport robot and store the container on the shelving unit.

In other implementations, a specific implementation of operation 320 may include: acquiring, as a target sub-device, a sub-device corresponding to a task performed by the transport robot from the plurality of sub-devices if the fault point is detected and the fault point is located on the transport robot; and controlling the target sub-device to go offline.

As an example, the fault point is located on a transport robot A, and a current task executed by the transport robot A is to transport the container to the automatic loading or unloading machine for unloading. In this case, it may be determined that the unloading machine of the automatic loading or unloading machine corresponds to the task performed by the transport robot A, and the unloader may be determined as the target sub-device and is controlled to go offline. For another example, the fault point is located on a transport robot B, and a current task executed by the transport robot B is to load the container at the automatic loading or unloading machine. In this case, it may be determined that the loader of the automatic loading or unloading machine corresponds to the task performed by the transport robot B, and the loader may be determined as the target sub-device and is controlled to go offline. In this way, the sub-device can accurately go offline according to the task corresponding to the transport robot with a fault.

In some implementations, the method further includes the following operations:

In block 304: a sub-device of the automatic loading or unloading machine corresponding to a control operation is controlled to go online or go offline if the control operation is received according to the control operation performed by a user on a control display interface.

As an implementation, the control device may be configured with a touch screen. A control display interface may be displayed on the touch screen. The control display interface may include icons corresponding to a plurality of control operation. A control operation performed by a user may be touching an icon. When the user touches the icon, the control device may generate a corresponding control instruction according to the touched icon and transmits the control instruction to the automatic loading or unloading machine, so as to instruct the automatic loading or unloading machine to go online/offline correspondingly. Optionally, the control display interface may include a whole machine bringing-online icon, a whole machine bringing-offline icon, a loader bringing-offline icon, an unloader bringing-offline icon, a one-button bringing-online icon, a manual mode icon, a loader initialization icon, an unloader initialization icon, and the like. Optionally, the control display interface may further display information such as a number, a position, and an operating state of the transport robot that performs the current task.

Optionally, the control display interface may further include distribution information, status information, and the like of a plurality of automatic loading or unloading machines. The status information of the plurality of automatic loading or unloading machines may be updated in real time according to the detected fault point. For example, when the automatic unloader goes offline, a state of the automatic unloader displayed on the control display interface is offline.

It may be understood that operation in block 304 may be performed after operation in block 303, before operation in block 303, or before any of operations from block 301 to block 303, which is not limited herein.

In this embodiment, the transport robot and the offline sub-device are controlled to execute the current task reversely, and it is detected whether the fault point is eliminated. When the transport robot and the offline sub-device execute the current task reversely, the fault point may be automatically eliminated. For example, for a container placed on the shelving unit of the unloader without misalignment, the fault point of the shelving unit of the unloader may be eliminated after the container is returned to the transport robot. In this way, automatic removal of the fault point can be realized, avoiding a labor cost for manual removal, and improving the efficiency of fault removal.

FIG. 11 is a schematic structural diagram of an automatic loading or unloading machine control apparatus 400 according to an embodiment of the present disclosure. As shown in FIG. 11, the automatic loading or unloading machine control apparatus 400 is applicable to a control device in a loading or unloading system. The loading or unloading system includes the control device, an automatic loading or unloading machine, and a transport robot. The automatic loading or unloading machine control apparatus 400 includes:

a bringing-offline control module 41, configured to control a sub-device of the automatic loading or unloading machine corresponding to a fault point to go offline if the fault point is detected during execution of a current task by the automatic loading or unloading machine and the transport robot;

a bringing-online and initialization control module 42, configured to control the offline sub-device to go online and initialize the transport robot and the offline sub-device after the fault point is eliminated, so as to cause the transport robot and the offline sub-device to re-execute the current task.

Optionally, the bringing-offline control module 41 includes:

a position acquisition unit, configured to control the sub-device of the automatic loading or unloading machine corresponding to the fault point to go offline if the fault point is detected, and acquire a position of the transport robot; and a stop unit, configured to control the transport robot to stop moving if the position of the transport robot is in a designated operating area.

Optionally, the bringing-offline control module 41 includes:

an instruction detection unit, configured to detect whether the sub-device corresponding to the fault point has an unfinished task instruction if the fault point is detected; and an execution unit, configured to control the sub-device corresponding to the fault point to complete the unfinished task instruction if the sub-device corresponding to the fault point has the unfinished task instruction, and control the sub-device corresponding to the fault point to go offline.

Optionally, the bringing-online and initialization control module 42 includes;

an initialization unit, configured to control the transport robot to switch back to an operating state of the transport robot before interacting with the automatic loading or unloading machine, and control the offline sub-device to switch back to the operating state of the offline sub-device before interacting with the transport robot.

Optionally, the initialization unit is specifically configured to detect whether action execution of the transport robot and action execution of the offline sub-device are hindered by an object; and control the transport robot to switch back to the operating state of the transport robot before interacting with the automatic loading or unloading machine and control the offline sub-device to switch back to the operating state of the offline sub-device before interacting with the transport robot if the action execution of the transport robot and the action execution of the offline sub-device are not hindered by the object.

The automatic loading or unloading machine control apparatus further includes:

a restart module, configured to control the transport robot and the offline sub-device to re-execute the current task; and a return module, configured to re-perform the step of controlling the transport robot to switch back to the operating state of the transport robot before interacting with the automatic loading or unloading machine, and controlling the offline sub-device to switch back to the operating state of the offline sub-device before interacting with the transport robot if the transport robot and the offline sub-device do not complete the current task.

Optionally, the initialization unit is further configured to control, if a container is detected in an area corresponding to the fault point, the transport robot and the automatic loading or unloading machine to transport the container back to a position where the container is located before the interaction between the automatic loading or unloading machine and the transport robot.

Optionally, the initialization unit is further configured to control, if at least two containers are detected on the automatic loading or unloading machine, the transport robot and the automatic loading or unloading machine to transport the at least two containers back to positions where the at least two containers are located before the interaction between the automatic loading or unloading machine and the transport robot.

Optionally, the automatic loading or unloading machine control apparatus further includes:

a reverse execution module, configured to control the transport robot and the offline sub-device to execute the current task reversely and detect whether the fault point is eliminated.

Optionally, the current task includes a plurality of task process nodes, and the reverse execution module is specifically configured to acquire a task process node corresponding to the fault point from the plurality of task process nodes as a fault process node; and control the transport robot and the offline sub-device to switch to a previous task process node of the fault process node and detect whether the fault point is eliminated.

Optionally, the automatic loading or unloading machine includes a plurality of sub-devices, and the bringing-offline control module 41 includes:

a target area detection unit, configured to acquire an area where the fault point is located on the automatic loading or unloading machine as a target area if the fault point is detected and the fault point is located on the automatic loading or unloading machine; and a bringing-offline unit, configured to acquire, as a target sub-device, a sub-device corresponding to the target area from the plurality of sub-devices, and control the target sub-device to go offline.

Optionally, the plurality of sub-devices include a loader and an unloader.

Optionally, the bringing-offline control module 41 is specifically configured to acquire, when the fault point is detected and the fault point is located on the transport robot, a sub-device as a target sub-device, the target sub-device is a sub-device corresponding to a task performed by the transport robot where the fault point is located from the plurality of sub-devices; and control the target sub-device to go offline.

Optionally, the automatic loading or unloading machine control apparatus further includes:

an operation module, configured to control, according to a control operation performed by a user on a control display interface, a sub-device of the automatic loading or unloading machine corresponding to the control operation to go online or go offline if the control operation is received.

Exemplarily, for this embodiment, refer to the above method embodiments. Since the principles and technical effects are similar, the details are not described herein again.

FIG. 12 is a schematic structural diagram of a control device 113 according to an embodiment of the present disclosure. As shown in FIG. 12, the control device 113 includes a memory 53 and a processor 52.

The memory 53 is configured to store instructions executable by the processor 52.

The processor 52 is configured to perform the method provided in the above embodiment.

The electronic device 113 further includes a receiver 50 and a transmitter 51. The receiver 50 is configured to receive instructions and data transmitted by an external device, and the transmitter 51 is configured to transmit instructions and data to the external device.

An embodiment of the present disclosure provides a computer-readable storage medium, having a computer program stored thereon. The computer program, when executed by the processor, implements the method for controlling an automatic loading or unloading machine provided in any of the above embodiments of the present disclosure.

The computer-readable storage medium may be a ROM, a random access memory (RAM), a CD-ROM, a magnetic tape, a floppy disk, an optical data storage device, or the like.

An embodiment of the present disclosure further provides a computer program product. The computer program product includes a computer program stored in a readable storage medium. At least one processor of an electronic device may read the computer program from the readable storage medium, and the at least one processor performs the computer program so that the electronic device performs the solution provided in any of the above embodiments.

It is to be understood that the disclosed apparatus and method in the embodiments provided in the present disclosure may be implemented in other manners. For example, the apparatus embodiments described above are merely exemplary. For example, module division is merely logical function division and may be other division in actual implementation. For example, a plurality of modules or components may be combined or integrated into another system, or some features may be ignored or not performed. In addition, the displayed or discussed mutual couplings or direct couplings or communicative connections may be implemented through some interfaces. The indirect couplings or communicative connections between the apparatuses or modules may be electrical, mechanical, or in other forms.

A person skilled in the art can easily figure out other implementations of the present disclosure after considering the specification and practicing the disclosure disclosed herein. The present disclosure is intended to cover any variations, functions, or adaptive changes of the present disclosure. These variations, functions, or adaptive changes comply with general principles of the present disclosure, and include common general knowledge or common technical means in the technical field that are not disclosed in the present disclosure. The description and embodiments are merely considered to be exemplary, and the actual scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the attached claims.

What is claimed is:

1. A method for controlling an automatic loading or unloading machine, executed by control device in a loading or unloading system, wherein the loading or unloading system comprises the control device, an automatic loading or unloading machine, and a transport robot, and the method comprises:

controlling a sub-device of the automatic loading or unloading machine corresponding to a fault point to go offline when the fault point is detected during execution of a current task by the automatic loading or unloading machine and the transport robot; and controlling the offline sub-device to go online again and initializing the transport robot and the sub-device that goes online again after the fault point is eliminated, to cause the transport robot and the sub-device that goes online again to re-execute the current task;

wherein the controlling a sub-device of the automatic loading or unloading machine corresponding to a fault point to go offline when the fault point is detected comprises:

detecting whether the sub-device corresponding to the fault point has an unfinished task instruction when the fault point is detected; and controlling the sub-device corresponding to the fault point to complete the unfinished task instruction when the sub-device corresponding to the fault point has the unfinished task instruction, and controlling the sub-device corresponding to the fault point to go offline.

2. The method according to claim 1, wherein the controlling a sub-device of the automatic loading or unloading machine corresponding to a fault point to go offline when the fault point is detected comprises:

controlling the sub-device of the automatic loading or unloading machine corresponding to the fault point to go offline when the fault point is detected, and acquiring a position of the transport robot; and controlling the transport robot to stop moving when the position of the transport robot is in a designated operating area.

3. The method according to claim 1, wherein the initializing the transport robot and the sub-device that goes online again comprises:

controlling the transport robot to switch back to an operating state of the transport robot before interacting with the automatic loading or unloading machine, and controlling the sub-device that goes online again to switch back to an operating state of the sub-device that goes online again before interacting with the transport robot.

4. The method according to claim 3, wherein the controlling the transport robot to switch back to an operating state of the transport robot before interacting with the automatic loading or unloading machine, and controlling the sub-device that goes online again to switch back to an operating state of the sub-device that goes online again before interacting with the transport robot comprises:

detecting whether action execution of the transport robot and action execution of the sub-device that goes online again are hindered by an object; and when the action execution of the transport robot and the action execution of the sub-device that goes online again are not hindered by the object, controlling the transport robot to switch back to the operating state of the transport robot before interacting with the automatic loading or unloading machine, and controlling the sub-device that goes online again to switch back to the operating state of the sub-device that goes online again before interacting with the transport robot.

5. The method according to claim 4, wherein after the controlling the transport robot to switch back to the operating state of the transport robot before interacting with the automatic loading or unloading machine, and controlling the sub-device that goes online again to switch back to the operating state of the sub-device that goes online again before interacting with the transport robot, the method further comprises:

controlling the transport robot and the sub-device that goes online again to re-execute the current task; and when the transport robot and the sub-device that goes online again do not complete the current task, re-performing the step of controlling the transport robot to switch back to the operating state of the transport robot before interacting with the automatic loading or unloading machine, and controlling the sub-device that goes online again to switch back to the operating state of the sub-device that goes online again before interacting with the transport robot.

6. The method according to claim 3, wherein the initializing the transport robot and the sub-device that goes online again further comprises:

controlling, when a container is detected in an area corresponding to the fault point, the transport robot and the automatic loading or unloading machine to transport the container back to a position where the container is located before the interaction between the automatic loading or unloading machine and the transport robot.

7. The method according to claim 3, wherein the initializing the transport robot and the sub-device that goes online again further comprises:

controlling, when at least two containers are detected on the automatic loading or unloading machine, the transport robot and the automatic loading or unloading machine to transport the at least two containers back to positions where the at least two containers are located before the interaction between the automatic loading or unloading machine and the transport robot.

8. The method according to claim 1, wherein before the controlling the offline sub-device to go online, and initializing the transport robot and the sub-device that goes online again, the method further comprises:

controlling the transport robot and the offline sub-device to execute the current task reversely and detecting whether the fault point is eliminated.

9. The method according to claim 8, wherein the current task comprises a plurality of task process nodes, and the controlling the transport robot and the offline sub-device to execute the current task reversely and detecting whether the fault point is eliminated comprises:

acquiring a task process node corresponding to the fault point from the plurality of task process nodes as a fault process node; and controlling the transport robot and the offline sub-device to switch to a previous task process node of the fault process node and detecting whether the fault point is eliminated.

10. The method according to claim 1, wherein the automatic loading or unloading machine comprises a plurality of sub-devices, and the controlling a sub-device in the automatic loading or unloading machine corresponding to a fault point to go offline when the fault point is detected comprises:

acquiring, when the fault point is detected and the fault point is located on the automatic loading or unloading machine, an area where the fault point is located on the automatic loading or unloading machine as a target area; and acquiring, as a target sub-device, a sub-device corresponding to the target area from the plurality of sub-devices, and controlling the target sub-device to go offline.

11. The method according to claim 10, wherein the plurality of sub-devices comprise a loader and an unloader.

12. The method according to claim 1, wherein the automatic loading or unloading machine comprises a plurality of sub-devices, and the controlling a sub-device in the automatic loading or unloading machine corresponding to a fault point to go offline if the fault point is detected comprises:

when the fault point is detected and the fault point is located on the transport robot, acquiring, as a target sub-device, a sub-device corresponding to a task performed by the transport robot where the fault point is located from the plurality of sub-devices; and controlling the target sub-device to go offline.

13. The method according to claim 1, further comprising:

controlling, according to a control operation performed by a user on a control display interface, a sub-device of the automatic loading or unloading machine corresponding to the control operation to go online or go offline when the control operation is received.

14. A control device, comprising: a memory and a processor, wherein the memory is configured to store instructions executable by the processor; and the processor is configured to perform operations of:

detecting, during execution of a current task by an automatic loading or unloading machine and a transport robot, whether a fault point exists on the automatic loading or unloading machine or the transport robot; wherein the automatic loading or unloading machine comprises a sub-device;

controlling a sub-device corresponding to the fault point to go offline in response to the fault point existing;

controlling the offline sub-device to go online again after the fault point is eliminated; and initializing the transport robot and the sub-device that goes online again to cause the transport robot and the sub-device that goes online again to re-execute the current task;

wherein the initializing the transport robot and the sub-device that goes online again to cause the transport robot and the sub-device that goes online again to re-execute the current task comprises:

controlling the transport robot to switch back to an operating state of the transport robot before interacting with the automatic loading or unloading machine, and controlling the sub-device that goes online again to switch back to an operating state of the sub-device that goes online again before interacting with the transport robot.

15. The control device according to claim 14, wherein the controlling the sub-device corresponding to the fault point to go offline in response to the fault point existing comprises:

detecting whether the sub-device corresponding to the fault point has an unfinished task instruction when the fault point is detected; and controlling the sub-device corresponding to the fault point to complete the unfinished task instruction in response to the sub-device corresponding to the fault point having the unfinished task instruction; and controlling the sub-device corresponding to the fault point to go offline.

16. The control device according to claim 14, wherein the initializing the transport robot and the sub-device that goes online again further comprises:

controlling, when a container is detected in an area corresponding to the fault point, the transport robot and the automatic loading or unloading machine to transport the container back to a position where the container is located before the interaction between the automatic loading or unloading machine and the transport robot.

17. A non-transitory computer-readable storage medium, storing computer-executable instructions, wherein the computer-executable instructions, when executed by a processor, are configured to implement operations of:

detecting, during execution of a current task by an automatic loading or unloading machine and a transport robot, whether a fault point exists on the automatic loading or unloading machine or the transport robot; wherein the automatic loading or unloading machine comprises a sub-device;

detecting whether a sub-device corresponding to the fault point has an unfinished task instruction when the fault point is detected;

controlling the sub-device corresponding to the fault point to complete the unfinished task instruction in response to the sub-device corresponding to the fault point having the unfinished task instruction;

controlling the sub-device corresponding to the fault point to go offline;

controlling the offline sub-device to go online again after the fault point is eliminated; and initializing the transport robot and the sub-device that goes online again to cause the transport robot and the sub-device that goes online again to re-execute the current task;

wherein the initializing the transport robot and the sub-device that goes online again comprises:

controlling the transport robot to switch back to an operating state of the transport robot before interacting with the automatic loading or unloading machine, and controlling the sub-device that goes online again to switch back to an operating state of the sub-device that goes online again before interacting with the transport robot.

* * * * *